United States Patent [19]

Rutz

[11] Patent Number: 4,844,348

[45] Date of Patent: Jul. 4, 1989

[54] SPRAY UNIT FOR SPRAY COATING ARTICLES

[75] Inventor: Guido Rutz, Gossau, Switzerland

[73] Assignee: Ransburg-Gema AG, Switzerland

[21] Appl. No.: 195,966

[22] Filed: May 19, 1988

[30] Foreign Application Priority Data

May 29, 1987 [DE] Fed. Rep. of Germany ....... 3718154

[51] Int. Cl.[4] .......................... B05B 5/04; H02M 7/10

[52] U.S. Cl. .................................... 239/703; 239/113; 239/293

[58] Field of Search ........................ 239/690, 700–708, 239/112, 113, 223, 288–288.5, 293, 296, 290

[56] References Cited

U.S. PATENT DOCUMENTS

| | | | |
|---|---|---|---|
| 4,337,895 | 7/1982 | Gallen | 239/223 |
| 4,462,061 | 7/1984 | Mommsen | 239/707 |
| 4,520,949 | 6/1985 | Seitz et al. | 222/108 |
| 4,555,058 | 11/1985 | Weinstein et al. | 239/703 |
| 4,598,871 | 7/1986 | Hartle | 239/706 |
| 4,720,044 | 1/1988 | Stemwedel, Jr. | 239/290 |

FOREIGN PATENT DOCUMENTS

| | | | |
|---|---|---|---|
| 2599281 | 12/1987 | France | 239/690 |

*Primary Examiner*—Andres Kashnikow
*Assistant Examiner*—Karen B. Merritt
*Attorney, Agent, or Firm*—Ostrolenk, Faber, Gerb & Soffen

[57] ABSTRACT

Spraying unit for spray coating articles with powdered or liquid material contains a spray head fastened to a front end of a tubular inner and axially extending support and an outer protective tube disposed concentrically about the inner support. The inner support and the outer protective tube are electrically insulative. One or more high-voltage generators are spacedly disposed about the inner support, axially rearward of the spray head, and within an elevated pressure chamber defined between the protective tube and the inner support. The arrangement is such that it produces a constant outwardly bound flow of gas from the elevated pressure chamber which flow prevents soilage of the internal parts by coating material. Structurally, the spraying unit is compact and slim and its parts are so interconnected that electrically conductive coating material cannot form conductive bridges that may bridge the high voltage at the electrostatically charging spray head or the high-voltage generators to ground or other lower potential regions.

19 Claims, 3 Drawing Sheets

SPRAY UNIT FOR SPRAY COATING ARTICLES

BACKGROUND OF THE INVENTION

The present invention relates to a spraying device for the electrostatic spraying of powdered or liquid coating material on articles and, more particularly, to a spraying device of this type at least a portion of which is constructed of electrically conductive material for forming a charging electrode. The charging electrode is connected to a high-voltage generator, disposed axially rearward of the charging electrode.

Generally, a spraying device of the type referred to herein includes an elongate, axially extending, support that is constructed of electrically insulated material, a spraying mechanism supported on a front end of the elongate support, and a protective tube constructed of electrically insulating material surrounding at least part of the spraying mechanism and the front and central portions of the elongate support. The rear of the elongate support protrudes from the rear of the protective tube and a spray head component of the spraying mechanism protrudes from the front of the protective tube.

A spraying device of the above mentioned type is shown in French Patent Application No. 2 543 853. But the spraying device must be connected to an external high-voltage generator, which generator is typically shared by several spraying devices. A rotary spray head is also included for spraying liquid coating material radially relative to the axis of the spraying device.

U.S. Pat. No. 3,731,145 discloses a pistol-shaped spraying device for spraying liquid coating material from a spray nozzle attached to a stationary spray head. A high-voltage generator which is powered from an external low voltage DC source is disposed within the unit. Adjustment of the magnitude of the high voltage is possible.

A similar pistol-shaped spraying device for powdered—rather than liquid—coating material is described in U.S. Pat. No. 3,608,823 which is based on Federal Republic of Germany Pat. No. 20 65 699.

A liquid spraying device with a rotary, pneumatically driven, spray head is described in U.S. Pat. No. 3,281,076. The rotary spray head is electrically conductive, bell, cup, disc or similarly shaped, forms an electrode for the electrostatic charging of the material being sprayed, and powered from an external high-voltage generator. Typically, a spray-coating system is formed which includes several such spray heads all of which are connected to a common external high-voltage generator. This requires a high-voltage generator which is very large and powerful, prevents local adjustment of the high voltage within each spray head and requires the use of expensive high-voltage cables to provide a connection to each spray head. Moreover, flashing over of the high voltage to the housing is possible and extremely risky to personnel operating such systems.

High-voltage generators are described in the aforementioned U.S. Pat. Nos. 3,731,145 and 3,608,823, the contents of which are incorporated by reference herein. Typically, a high-voltage generator includes at least one voltage multiplier circuit, preferably comprising a cascade circuit of capacitors and rectifiers or a voltage divider circuit with ohmic resistors. The voltage multiplier circuit transforms a low alternating voltage of, for instance, 4000 V to a voltage of, for example, 140,000 V. Often, a transformer for transforming an input alternating voltage of, for example, 10 V to the required 4000 V is also incorporated in the high-voltage generator. In the latter case, thinner and less expensive electrical feed cables can be used.

It is also known to include in high-voltage generators DC to AC converters, normally comprised of an oscillator for producing a 10 V alternating voltage from a direct voltage whereby the feed lines to the spraying device may be constituted of a simpler DC cable which poses no danger to users. All of the foregoing techniques may be applied in the context of the present invention.

SUMMARY OF THE INVENTION

It is an object of the present invention to include one or more high-voltage generators within the spraying device in a manner which safely avoids the danger of a high voltage being bridged to other voltage potentials and in particular to ground potential within the device. In conventional spraying devices, where ground potential is connected to the input side of the high-voltage generator and the supporting structure of the spraying unit is electrically conductive and grounded, flash-over of the high voltage to ground and severe danger to personnel are possible.

It is a further object of the present invention to provide a spraying device whose outer surface can be easily and rapidly cleaned from undesired accumulations of coating material.

The foregoing and other objects of the invention are realized by a spraying device in which the high-voltage generator is located behind the spray head and within a vented chamber which is supplied with gas at an elevated pressure. The elevated-pressure chamber is formed between a nonconductive protective tube and a similarly nonconductive axially extending inner support in the spraying device. At least one gas inlet leads into the gas chamber to produce in the chamber an elevated gas pressure higher than the ambient atmospheric pressure outside the protective tube and, therefore, a constant and outwardly directed flow of gas from the chamber. The elevated pressure gas escaping from the chamber is replaced by a stream of gas flowing into the chamber through inlet leads.

Numerous advantages derive from the present invention. For example, the high voltage will not flash-over to other parts which are at different electrical voltage potentials, even if loose coating particles should fly around and deposit on the surfaces of the spraying unit. This reliably prevents the coating material from forming conductive bridges within the spraying device. Moreover, the structure is simple, compact and lightweight. Its various components are easily replaceable. The surface in the device where the coated material flows is entirely smooth and, accordingly, easily and rapidly cleanable.

Other features and advantages of the present invention will become apparent from the following description of the invention which refers to the accompanying drawings.

DETAILED DESCRIPTION OF THE DRAWINGS

Figure 1:
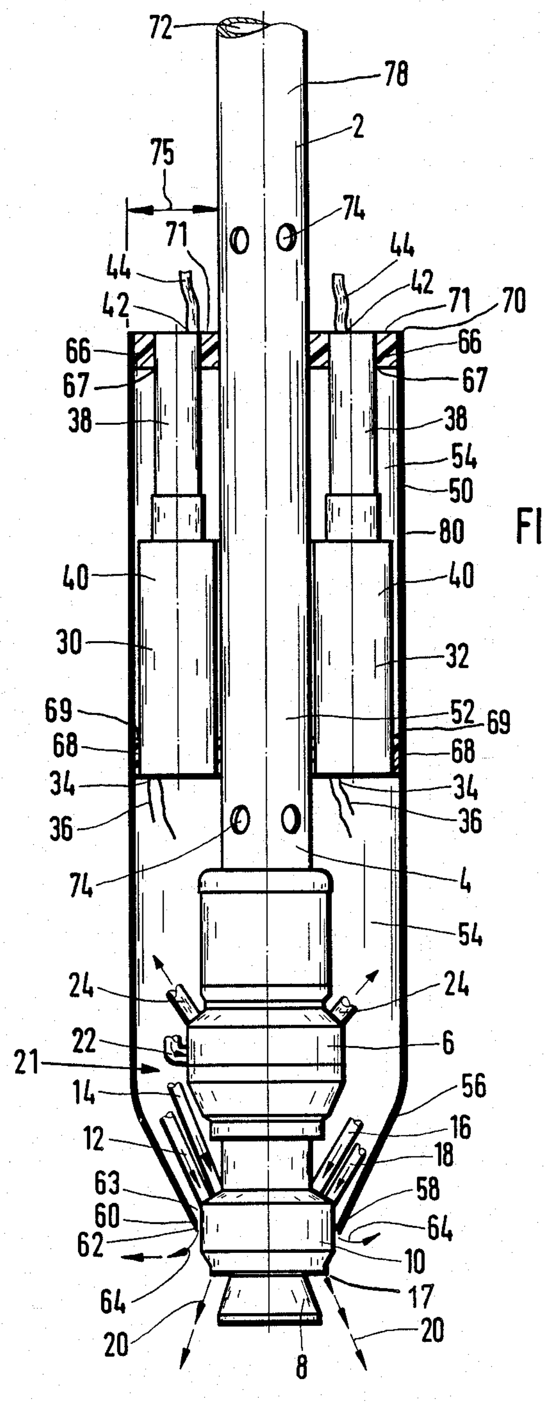
FIG. 1 is a side view of a spraying device according to the present invention showing the protective tube in longitudinal cross-section.

Referring to FIG. 1, a first embodiment of a spraying device of the present invention comprises an axially extending main support 2 which is constructed of electrically insulating material and is preferably tubular. A pneumatic, compressed-air, motor 6 or a gas turbine is fastened to the front end 4 of support 2 for rotating a rotatably mounted spray head 8 that is disposed axially in front of motor 6. Spray head 8 is bell, cup, disc or similarly shaped and is rotatably mounted to a fluid connector 10.

Fluid connector 10 has several conduits including at least one conduit 12 for feeding of liquid coating material, for example, electrically conductive black lacquer, therethrough. At least one conduit 14 is provided for carrying solvent and another conduit 16 serves to supply cleaning air for spray head 8. Air is supplied through a conduit 18 for forming an annular air curtain 20 which emerges from an annular nozzle arrangement 17 of fluid connector 10.

In operation, coating material is atomized and emerges as a spray jet from the spray head 8, the spray jet being limited and shaped by the air curtain 20. Spray head 8, connector 10 and compressed-air motor 6 constitute a spraying mechanism 21 and since they are all formed of metal and mechanically interconnected they are at the same electrical potential.

Motor 6 is driven by compressed gas supplied through gas line 22, the compressed air flowing into motor 6 via line 22 and exhausting via conduit 24.

A pair of circumferentially spaced high-voltage generators 30 having high voltage outputs 34 are disposed about support 2, rearward of the front end 4 thereof. Lines 36 couple the high voltage outputs 34 to spray head 8, raising the voltage thereof to about 140,000 V and enabling it to serve as an effective charging electrode. This charging voltage also prevails at connector 10 and compressed-air motor 6 as they are electrically connected to the spray head 8.

The rate at which electrical energy is consumed by high-voltage generators 30 and 32 depends on the electrical conductivity and/or quantity of coating material to be coated per unit time and also on the geometrical shape of the article to be coated. Accordingly, a lower or a higher voltage and/or current may be required. In certain cases, a single high-voltage generator 30 may be sufficient. However, if necessary, two or more high-voltage generators 30 and 32 may be provided and connected either in series or in parallel to achieve desired electrical driving abilities. Note that there is room for more than two such high-voltage generators 30/32 around support 2.

Each of high-voltage generators 30 and 32 comprises a transformer 38 and a voltage multiplier circuit 40. The inputs 42 of the high-voltage generators 30 and 32 receive, via a low-voltage cable 44, a low alternating voltage of, for example, 10 V at 16 KHz and a ground potential. The low level input voltage is then transformed by transformer 38 to a considerably higher voltage of, for example, 4000 V. Subsequently, the voltage multiplier circuit 40 transforms the 4000 V to a desired charging voltage, typically in the range of from 30,000 V to 140,000 V DC. Preferably, voltage multiplier circuit 40 is constituted of a network of capacitors and rectifiers.

Alternately, the voltage multiplier circuit 40 also contains a DC/AC converter. In this case, a low DC voltage of, for example, 10 V may be received via the low voltage cable 44, that voltage being initially converted into an alternating voltage of 10 V and thereafter applied to the transformer 38. As before, transformer 38 raises the 10 V AC voltage to a potential of about 4000 V which voltage is then applied to voltage multiplier circuit 40. Since spray head 8 requires a very high DC voltage it is desirable to step up the DC voltage at input 42 through a voltage multiplier circuit consisting of a plurality of ohmic voltage dividers. In both types of voltage multiplier circuits 40 note that the voltage is increased in several steps. The voltage multiplier circuits 40 contemplated herein are described, for example in U.S. Pat. No. 3,608,823 which is based on German Pat. No. 20 65 699. An embodiment of the spray head 8 and the compressed-air motor 6 is disclosed in U.S. Pat. No. 3,281,076.

The generally forward section of support 2 and in particular its front tube end 4 is surrounded by a generally cylindrical protective tube 50 which extends coaxially and concentrically about the tubular support 2. Tubes 2 and 50 define an annular space forming an elevated pressure gas chamber 54. Protective tube 50 extends from input 42 of the transformers 38 of high-voltage generators 30/32, beyond the front end 4 of support 2, and reaches to connector 10. The front end section 56 of protective tube 50 is frustoconical, narrowing at the connector 10 and leaving at its narrowed front end 58 an annular opening 60 through which connector 10 protrudes. The front edge 62 of protective tube 50 and connector 10 form between them an annular slot 63, defining a seal or flow throttle, through which air 64 may escape from the elevated pressure gas chamber 54. The air 64 emerging from annular slot 63 forms an air curtain that prevents coating particles from moving backwardly from spray head 8 such as to flow inwardly into chamber 54 or to contaminate the outer surface of tube 50.

Chamber 54 houses the high-voltage generators 30 and 32, their electric output lines 36, the compressed-air motor 6 and its feed and discharge lines 22 and 24, and the rear section of connector 10 and its lines 12, 14, 16 and 18.

Annular flanges 66 and 68, constructed of electrically insulating material, support high-voltage generators 30 and 32, in the space between inner central support 2 and the outer protective tube 50. Compressed-air motor 6 and spray head 8 are fastened to the axially forward end of support 2, the motor 6 being disposed in the space between the high-voltage generators 30 and 32 and the spray head 8. Thus, the size of the unit is comparatively small even if more than two high-voltage generators are arranged circumferentially around the tubular support 2.

Each of flanges 66 and 68 is ring-shaped and has a respective opening 67, 69 for supporting high-voltage generators 30 and 32 therein and permitting the creation of air flow conduits. The more rearwardly located flange 66 is about flush with the rear end 70 of protective tube 50, the opening 67 thereof together with the annular slot 63 at the front end 58 of protective tube 50 (near spray head 8) forming air outlets for air to flow from within the spraying device into the atmosphere. Note that air exiting from rear end 70 flows past and thus cools the high-voltage generators 30 and 32. A similar cooling effect is obtained from air flowing in the space 54 past compressed-air motor 6, connector 10, and out through annular slot 63 which cools motor 6 and its bearings as well as the connector 10 and the spray head 8.

Pressurized air may be fed into the chamber 54 via a special line. However, in the embodiment of FIG. 1, the air entering chamber 54 is supplied from the exhaust line 24 of compressed-air motor 6.

The tubular support 2 also defines a tube channel 72, providing an inner path for guiding fluid and electric lines therethrough. These lines may be routed into and out of channel 72 via front and rear holes 74.

An electric motor may be used instead of the compressed-air motor 6 for driving the rotary spray head 8.

Formation of the support 2 as a tube produces a support which is radially compact, yet quite sturdy to withstand large radial forces. Further, since the high-voltage generators 30/32 are disposed behind the spray mechanism 21 and around the support 2, the outer diameter of the spraying device is comparatively small and the device is elongate which is desirable. The extension of protective tube 50 over the spray mechanism 21, high-voltage generators 30 and 32, front section of the support 2 and the various lines 12, 14, 16, 18, 22, 24, 34 and 36 provides protection for these elements from being contaminated by coating material flowing in the surrounding atmosphere. And despite being elongate, the spraying unit of the invention is still relatively light. In fact, the elongate protective tube 50 prevents particles of coating material from forming electrically conductive bridges from spray head 8 to electric input lines 42 which might otherwise be formed on the outer surfaces of the unit.

Preferably, the outside diameter of protective tube 50 from its rear end 70 to near the spraying mechanism 21 is comparatively large, preferably two or three times as large as the outside diameter of support 2. The diameter of protective tube 50 tapers down drastically adjacent spray head 8 to a size comparable to the diameter of support 2. As a result, the rear end 70 of the spraying device is burbled, preventing coating material floating in the atmosphere from settling and collecting on the rear end 71 of flange 66. The radial distance 75 separating the protective tube 50 and the support 2 at the rear end 70 is sufficient to prevent arcing and electrical conductance between the various elements, even if coating material should collect on the outer surface 80 of protective tube 50 or at the protruding rear support section 78 of support 2. Similarly, current cannot flow from the outer surface 80 of the tube 50 to either the electric input lines 42, the ground potential line or to the protruding rear support section 78.

Accordingly, the present invention meets its stated objectives and is well suited for handling electrically conductive coating materials, particularly liquid coating materials. However, the advantages of the invention are present even with powdered coating materials. Further, since the outer surface 80 of tube 50 is the only exposed outer surface, cleaning can be completed rapidly, in contrast to cleaning of prior art embodiments which have no protective tube.

Figure 2:
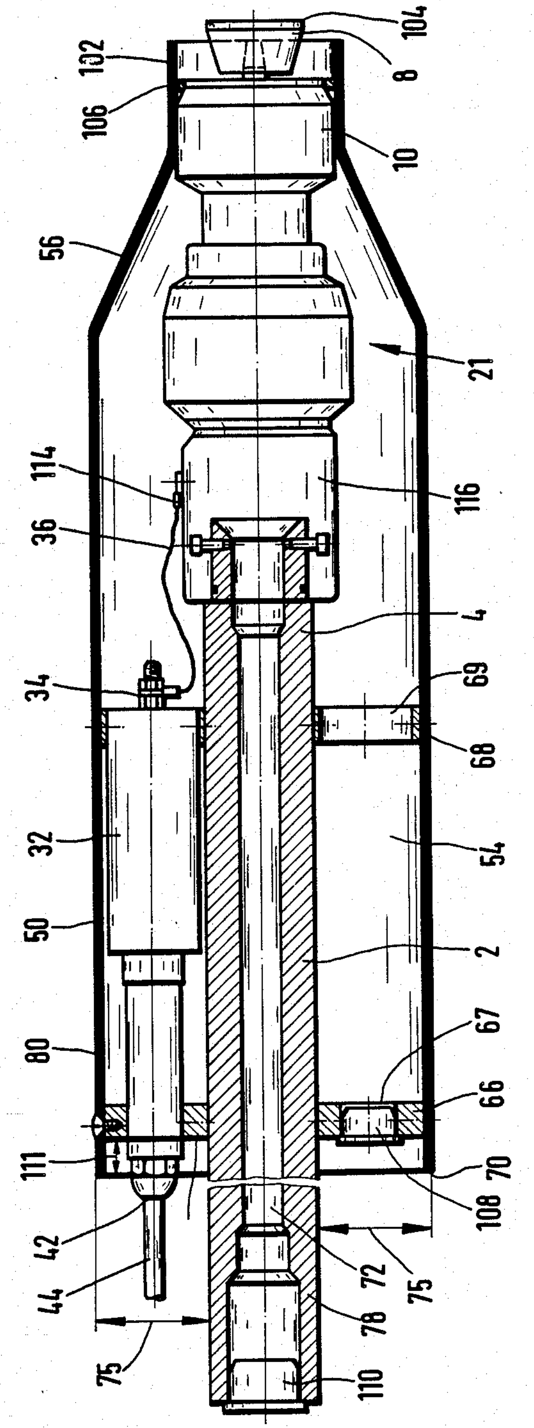
FIG. 2 depicts a second embodiment of a spraying device according to the present invention.
Figure 3:
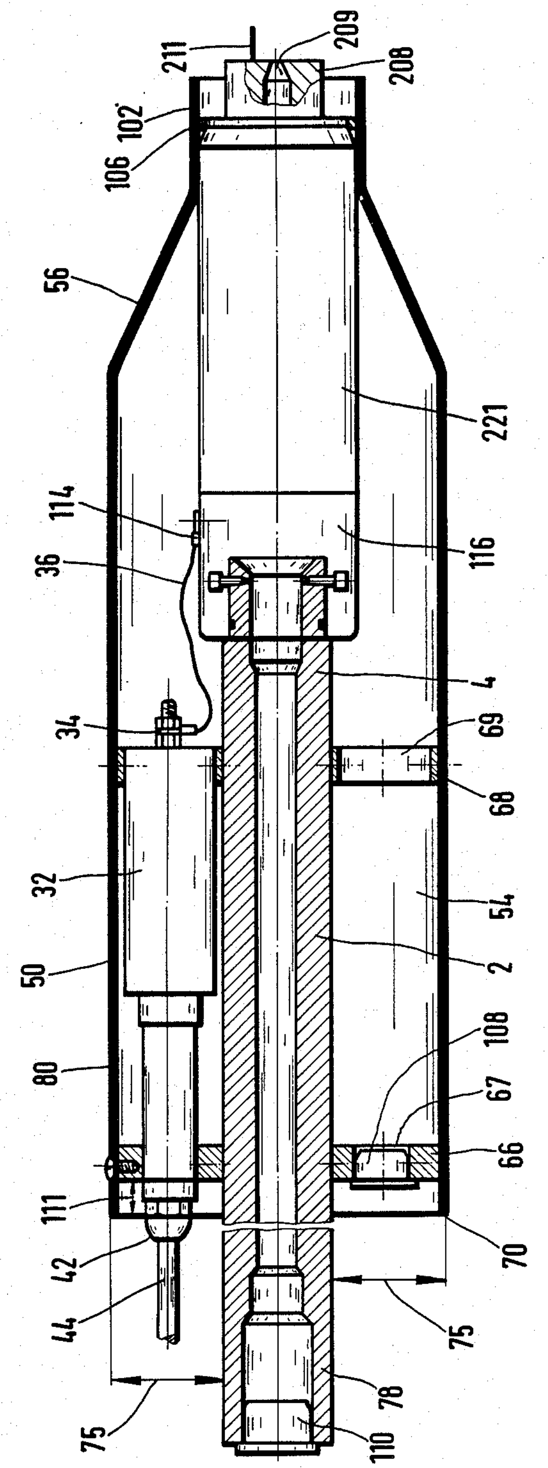
FIG. 3 shows a third embodiment of a spraying device according to the present invention.

Further embodiments of the invention, illustrated in FIGS. 2 and 3, incorporate many of the elements of the first embodiment. The repeated elements bear identical reference numerals and a description thereof is unnecessary.

In FIG. 2, the frustoconical end section 56 of tube 50 terminates in a tube socket 102 which extends to the front edge 104 of spray head 8. An annular packing 106 extends annularly and between the front of fluid connector 10 and tube socket 102. Only a single high-voltage generator 32 is provided in the present embodiment and consequently the openings 67 and 69 of flanges 66 and 68 which normally accommodate a second high-voltage generator remain unused. The more rearward opening 67 is closed off by a plug 108.

Another plug 110 closes the rear end of tube channel 72 of support 2. Further unlike the first embodiment, the more rearward annular flange 66 is offset slightly inward into the space 54 relative to rear end 70 of protective tube 50. This leaves a distance 111, preferably 2 to 30 mm, between the rear flange 66 and the rear end 70 to prevent airborne particles of coating material floating near rear end 70 from accumulating and settling on rear flange 66.

The last mentioned feature and the radial spacing 75 between the protective tube 50 and the rear end section 78 of support 2 create an electrically nonconductive region which protects against the creation of an electrical path between the major portion of the surfaces of tube 50 and the parts 21 and 32 arranged therein to the rear end section 78 which extends out of the tube 50. The protection is maintained even if the entire outer surface 80 of the protective tube 50 becomes covered with electrically conductive coating material.

It is also advantageous, as shown in FIG. 2, to connect the high-voltage output 34 indirectly to spray head 8, by means of electric line 36 and connection post 114 of fastening element 116, the latter being electrically conductive and serving to connect spray mechanism 21 to the front end 4 of support 2. This avoids usage of less reliable and more expensive wiper contacts or the like for effecting electrical connection between the generator 32 and the rotating spray head 8.

The embodiment of FIG. 3 is generally similar to FIG. 2, the difference lying in that the spray mechanism 221 in FIG. 3 is not rotatable. Rather, a stationary spray head 208, formed of electrically conductive material and having a central spray nozzle 209, is used. Spray head 208 forms a charging electrode and may, in addition, include a forward-protruding needle-like electrode 211. As before, fastening element 116 fastens the spray device 211 to the front end 4 of support 2, the aforementioned electrical line 36 providing a connection to the high-voltage output 34. Note that in this embodiment there is no need for a motor such as the motor 6. Accordingly, to create an elevated pressure within chamber 54, one of the openings 67 and the rear flange 66 form a gas inlet through which gas, preferably air, is introduced into the chamber 54 for being vented and for providing the benefits that have been described in relation to the first embodiment.

Spray device 221 is effective for spraying liquid coating material onto articles but, it is also capable, in accordance with another embodiment, of being shaped such that it is suitable for electrostatically spraying pulverized coating material on articles. While intricate details commonly found in a device for spraying pulverized materials are not illustrated in the diagrammatic illustrations presented herein, these structures are well known in the art and a description thereof is deemed to be unnecessary.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A spraying device, comprising:

an axially extending, elongate, and electrically insulated inner support having a front position and a rear portion;

spray head means comprising electrically conductive material for charging coating material to be sprayed on articles, the spray head means mounted to the front portion of the inner support;

an electrically insulating protective tube disposed concentrically about the inner support, the inner support and the protective tube defining therebetween and to the rear of the spray head means an elevated pressure chamber;

at least two high-voltage generators in the elevated pressure chamber for generating a high voltage effective for charging the coating material, the at least two high-voltage generators being space circumferentially relative to one another about the inner support;

electrical connection means for connecting the at least two high-voltage generators to the spray head means;

at least two annularly shaped and axially spaced flanges constructed of electrically insulating material and disposed between the inner support and the protective tube, each of the flanges having defined therein at least first and second angularly spaced openings, one of the high-voltage generators extending into and supported by the first openings of the flanges and another one of the high-voltage generators extending into and supported by the second openings of the flanges;

gas conduit means for the entrance therethrough of pressurized gas into the chamber; and gas outlet means for enabling gas to flow out of the elevated pressure chamber.

2. The spraying device of claim 1, wherein the protective tube has a rear end and wherein the rear portion of the inner support protrudes from the rear end of the protective tube.

3. The spraying device of claim 2, wherein the gas conduit means comprises at least one gas inlet which leads into the elevated pressure chamber.

4. The spraying device of claim 2, wherein the inner support is tubular.

5. The spraying device of claim 4, wherein the protective tube narrows in cross-section adjacent the spray head means and defines thereat an annularly extending gas outlet, forming the gas outlet means and effective for enabling the elevated pressure gas in the elevated pressure chamber to flow therethrough.

6. The spraying device of claim 4, wherein the protective tube is funnel shaped in the vicinity of the spray head means.

7. The spraying device of claim 4, further including at least one opening defined in and located adjacent an axial rear end of the protective tube.

8. The spraying device of claim 1, wherein the protective tube has a distal end at the rear end thereof and wherein a first one of the flanges which is nearer the rear end of the inner support is axially spaced from the distal end of the protective tube toward the spray head means.

9. The spraying device of claim 8, wherein the spacing of the first flange from the distal end is in the range of between 2 to 30 mm.

10. The spraying device of claim 4, wherein the spray head means comprises a stationary spray nozzle.

11. The spraying device of claim 10, wherein the stationary spray nozzle further comprises a needle-like electrode projecting axially therefrom.

12. The spraying device of claim 4, wherein the spray head means comprises a rotary spray head.

13. The spraying device of claim 12, further comprising means for rotating the rotary spray head.

14. The spraying device of claim 13, wherein the rotating means comprises a compressed-air motor.

15. The spraying device of claim 13, wherein the rotating means comprises a gas turbine.

16. The spraying device of claim 14, wherein the compressed-air motor comprises a gas inlet and an exhaust gas outlet and wherein the exhaust gas outlet is vented into the elevated pressure chamber.

17. The spraying device of claim 1, wherein the high-voltage generators are effective for transforming a voltage of about 10 V AC to a voltage of about 30,000 to 140,000 V AC.

18. The spraying device of claim 4, further comprising means for guiding electrical leads through the tubular inner support.

19. The spraying device of claim 18, wherein the guiding means in the tubular support comprises at least one first aperture in the inner support in the region thereof lying in the elevated pressure chamber and at least one second aperture in the inner support in the region thereof lying outside the elevated pressure chamber.

* * * * *